United States Patent Office 3,177,191
Patented Apr. 6, 1965

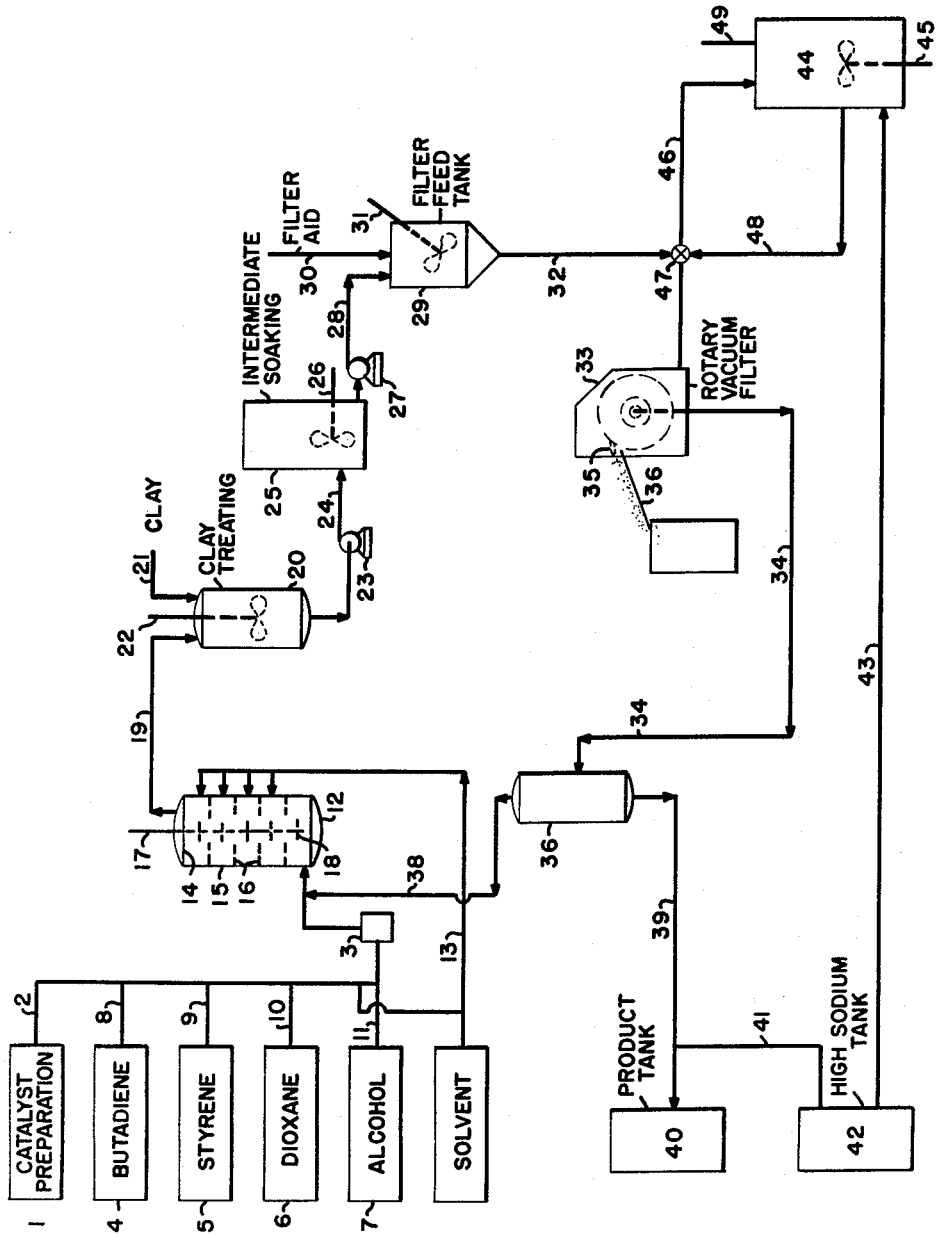

3,177,191
REMOVAL OF ALKALI METALS FROM HYDRO-
CARBON POLYMERS CONTAINING SAME
Arthur Douwe de Vries and Donald Dunwody Dunlop,
both of Baton Rouge, La., assignors to Esso Research
and Engineering Company, a corporation of Delaware
Filed Oct. 26, 1961, Ser. No. 147,909
4 Claims. (Cl. 260—94.2)

This invention relates to the recovery of alkali metals from hydrocarbon polymer solutions. More particularly it relates to the removal of a finely dispersed alkali metal from the reaction product obtained by the polymerization of an unsaturated hydrocarbon, particularly a conjugated diolefin such as 1,3-butadiene with or without other co-polymerizable monomers; e.g., vinyl aromatic hydrocarbons, such as styrene or its homologs.

It is known to polymerize various unsaturated hydrocarbons such as olefins or diolefins in the presence of alkali metals or organic compounds thereof such as their alkyl derivatives to produce resins, rubbery materials, drying oils and the like.

The products obtained by the above polymerization reactions contain the alkali metal or soluble forms thereof dispersed or dissolved therein and these must be removed prior to use in order to avoid the normal hazards due to the presence of free metal, to avoid the effects of alkalinity if the product comes into contact with water, to avoid the failure of films made from liquid polymers and to avoid an undesirable increase in the curing rate of solid polymers.

It is known to remove residual alkali metal from the liquid polymerization products obtained from unsaturated organic compounds by the use of alkali metal catalysts by treatment with clays such as Attapulgus clay, Super Filtrol, used cracking catalysts, such as silica or alumina gels or the like. The clays are suitably removed from the polymer solution by filtration with or without a filter aid. This process usually reduces the sodium content to less than 100 p.p.m. Occasionally, however, the finished product is found to contain more than the permissible 100 p.p.m. and for this reason cannot be accepted by the trade. Refiltration of the product does not remove this excess alkali metal, even though additional clay is added. This failure of the filter to remove the alkali metal has been found to be due to the presence of an inadequate amount of gel formed in the synthesis of the polymer. As shown below the presence of gel is necessary for the adequate removal of the alkali metal by the clay or the filter. If for some reason or the other synthesis conditions change so that insufficient gel is formed then the alkali metal, particularly that present in the form of organometallic compounds, will pass through the filter and the final product will be high in residual alkali metal.

It has now been found that this difficulty with clay filtration of the reactor effluent can be avoided either by adding a small amount of gel to the reactor effluent or by mixing any filtrate containing excess alkali metal or any finished product which contains it with the feed to the filter.

The invention is particularly applicable to the preparation of liquid polymer oils by the polymerization of $C_4$ to $C_6$ diolefins, such as butadiene-1,3 or the copolymerization of such diolefins with 0.5 to 40% by weight of a vinyl aromatic hydrocarbon, such as styrene or the like. The polymerization is carried out in the presence of a hydrocarbon diluent and an alkali metal catalyst such as sodium, potassium, lithium, cesium, or rubidium. Suitable diluents include hydrocarbons boiling $-15$ to $200°$ C., e.g., naphtha, Varsol, hexane, heptane or the like. The diluents are employed in amounts ranging from 50 to 500, preferably 200 to 300, parts per 100 parts of monomers. The temperature of reaction ranges from 25 to $105°$ C., preferably between 40 and $85°$ C., either batchwise or continuous.

It is also desirable to employ about 10–40 parts by weight of an ether promoter per 100 parts of monomers. Suitable ethers are dioxane and diethyl ether. The use of an alcohol, such as methanol, ethanol, isopropanol, normal pentanol and the like is also desirable to activate the catalyst.

The process of the present invention is particularly applicable to the multi-stage continuous process described and claimed in U.S. Patent No. 2,849,510, issued August 26, 1958, in the names of Stanley E. Jaros and Joseph F. Nelson. The disclosures of this patent are incorporated herein by reference.

The reaction product is best mixed with an acid clay, such as Attapulgus and filtered on a rotary filter or the like, preferably coated with a filter aid, such as filtercel. This process is described in U.S. Patent No. 2,862,982, issued December 2, 1958, to Neville L. Cull and Joseph K. Mertzweiller, and is also incorporated herein by reference. This process reduces the alkali metal content to less than 100 p.p.m. but occasionally the filtrate will contain more alkali metal than can be tolerated; i.e., more than 100 p.p.m.

In accordance with one embodiment of this invention any portion of the filtrate which contains more than 100 p.p.m. of alkali metal is segregated and blended with the feed to the filter in proportions of about one part of filtrate to at least one part of filter feed or more. Although it is possible to blend the effluent from the filter with the filter feed, it may be more convenient to determine whether too much alkali metal is present after the product is stripped and finished. In this case any product which contains excess alkali metal is mixed with naphtha or other solvent in substantially the same proportion as the filtrate and then blended with the filter feed as described above.

In accordance with another embodiment of the invention gel obtained from previous runs may be added to the reactor effluent. Enough gel must be added to ensure that all the alkali metal is retained on the filter with the clay. Usually about 0.1 wt. percent gel is all that need be added but amounts up to 5 or even 10% can be added, if desired.

Referring now to the drawing, a finely divided suspension of alkali metal in naphtha, hereinafter referred to as sodium, is withdrawn from catalyst preparation vessel 1, and introduced by line 2 into mixer 3. Simultaneously butadiene from tank 4, styrene from tank 5, dioxane and naphtha make-up diluent from tank 6, and alcohol from tank 7 are passed by lines 8, 9, 10, and 11, respectively, into mixer 3 and introduced into the lowermost stage of reactor 12. Naphtha solvent from line 13 may be introduced to each of the second and succeeding stages of the reactor as needed.

The reactor itself consists of a large vessel 14 surrounded by cooling jackets 15 and divided into multiple stages by means of horizontal baffles 16. A vertical shaft 17 bearing blades 18 is disposed centrally of vessel 14 as an agitator. Polymerization occurs in reactor 12 and the viscous polymer solution passes from stage to stage by overflowing between the baffles 16. The polymer solution passes from the reactor by line 19 to clay-treating vessel 20. Attapulgus clay, containing bound water in an amount sufficient to neutralize the sodium and to absorb the organic derivatives of sodium, is added to vessel 20 through line 21. If desired, 0.1 wt. percent gel, or more, obtained in previous runs, may also be added at this point. The mixture is agitated by stirrer 22 and passed by pump 23 and line 24 to soaking vessel 25 where the mixture is allowed to stand for a sufficient length of time to complete the removal of the sodium and organo-sodium compounds from the polymer. Mild agitation can be given the contents of this vessel by agitator 26. After removal of the sodium and organo-sodium compounds from the polymer is complete, the mixture is passed by pump 27 and line 28 to filter feed tank 29 where a filter aid, such as celite, is added to the polymer-clay mixture by line 30. The contents of tank 29 are kept from settling by means of agitator 31. Flter feed tank 29 feeds by line 32 into rotary vacuum filter 33 from which a solution of polymer free of sodium and organo-sodium compounds is removed through line 34. Spent filter cake is removed by doctor blade 35 and can be recovered for treatment to remove occluded and absorbed polymer if desired. The polymer removed through line 34 is passed to stripping tower 36 from which naphtha, dioxane, and any residual isopropyl alcohol is removed overhead and recycled to reactor 12 through line 38. Liquid polymer of the desired concentration is removed from the bottom of tower 36 by line 39 and passed to tank 40. Whenever it is determined by analysis that the product flowing in line 39 contains more than 100 p.p.m. of sodium, it is passed by line 41 to high sodium tank 42. The polymer in tank 42 is treated to recover sodium by passing it by line 43 to tank 44 equipped with stirrer 45. Likewise a portion of the filter feed flowing in line 32 is diverted by line 46 to tank 44 after closing valve 47 where it is mixed with no more than equal quantities of the product introduced into tank 44 through line 43. Enough naphtha is added to the mixture in tank 44 by line 49 to bring its composition to substantially that of the filter feed flowing through line 32. The mixture of product polymer and filter feed is then removed from tank 44 by line 48 and reintroduced into line 32 and passed to filter 33.

The above described process affords a means for removing sodium or other alkali metal from a diolefin polymer product which contains more sodium than can be tolerated. The process is unexpected since it has been known that refiltration of the product will not remove the sodium. However, the gel present in the filter feed acts as a binder to hold the sodium or more probably the organo-sodium compounds present on the clay. This being the case it is also a part of this invention to control the gel content of the reactor effluent so as to improve the separation and removal of the sodium. One means of controlling this gel content is to add gel to the reactor effluent before it passes to the filter. If sufficient gel is maintained in the feed to the filter the sodium will always be adequately removed from the polymer on the filter. However, it is usually more practical to mix any high sodium product with the filter feed on the assumption that the filter feed already contains adequate amounts of gel.

The following examples are given to illustrate but not to limit the invention.

EXAMPLE I

A liquid polymer prepared from the following charge:

| | Parts by wt. |
|---|---|
| Butadiene-1,3 | 80 |
| Styrene | 20 |
| Dioxane | 20 |
| Naphtha (B.P. 150–200° C.) | 100 |
| Isopropanol | 6.2 |
| Na (based on monomers) | 1.5 |
| Temperature, 50° C. | | and containing 600 p.p.m. of sodium after processing as described in the drawing was drawn from line 39 and divided into two portions, each of which was diluted with 85 wt. percent naphtha. One portion (A) was filtered through filter aid and the other (B) was mixed with the feed to the filter flowing in line 32 as described in the drawing and filtered through filter aid. The following results were obtained.

| Portion: | Na, p.p.m. (based on polymer) |
|---|---|
| (A) after filtration | 313 |
| (B) after filtration | 19 |

EXAMPLE II

Sample of the finished product of Example I containing sodium in excess of 100 p.p.m. was drawn from line 39 and diluted with naphtha to about 25% NVM. Samples of reactor product flowing in line 19 of the drawing was likewise diluted to 25% NVM with naphtha and the two were blended to give mixtures of varying gel content but constant non-volatile content (NVM). These mixtures were filtered through filter aid with and without added clay and the sodium content of the filtrates determined. Data were obtained as shown in Table I.

The data in Table I show that the presence of gel is necessary for the removal of substantially all of the sodium present in the polymer product (compare Run No. 7 with Run No. 8). The clay must be present in substantiall quantities; e.g., 4 to 5% more, although amounts of clay as low as 1% give satisfactory results provided the gel content is high (Run No. 5).

EXAMPLE III

A high sodium content polymer product (more than 600 p.p.m.) flowing in line 39 or a commercial plant was passed by line 41 and mixed with equal portions of the filter feed flowing in line 32 as described in the drawing. The final product withdrawn from line 39 was found to contain less than 20 p.p.m. of sodium.

*Table I*

EFFECT OF GEL AND CLAY ON SODIUM REMOVAL FROM POLYMER PRODUCT

| Run No | | | | 1 | 2 | 3 | 4 | 5 | 6 | 7 | 8 |
|---|---|---|---|---|---|---|---|---|---|---|---|
| Plant Product, Wt. Percent | | 100 | | 25 | 12.5 | 16.0 | 19.6 | 8.3 | 12.5 | 25 | 19.6 |
| Filter Feed, Wt. Percent | | | 100 | | 22.0 | 15.9 | 9.5 | 29.3 | 22.0 | 0 | 9.5 |
| Unit Solvent, Wt. Percent | | | | 75 | 65.5 | 68.1 | 70.9 | 62.4 | 65.5 | 75 | 70.9 |
| Clay Added, Wt. Percent | | | | 0.5 | 0.5 | 0.5 | 0.5 | 0.18 | 4.0 | 5.0 | 4.0 |
| Composition: | | | | | | | | | | | |
| NVM, Wt. Percent | | 99.6 | 57.0 | 25 | 25 | 25 | 25 | 25 | 25 | 25 | 25 |
| Gel | | | 6.33 | 0 | 1.4 | 1.0 | 0.6 | 1.85 | 1.4 | 0 | 0.6 |
| Na, Wt. Percent | | | 1.88 | | | | | | | | |
| Clay, Wt. Percent | | | 3.31 | 0.5 | 1.2 | 1.0 | 0.8 | 1.2 | 4.7 | 5.0 | 4.3 |
| Na, p.p.m. | 600 | | | | | | | | | | |
| After Filtrations: | | | | | | | | | | | |
| Na, p.p.m. (100% NVM Basis) | | | | 173 | 120 | 187 | 203 | 59 | 13 | 193 | 0 |

The nature of the present invention having been thus fully set forth, what is claimed as new and useful and desired to be secured by Letters Patent is:

1. In a process for producing polymers of conjugated diolefins of 4 to 6 carbon atoms wherein the diolefins are polymerized in a polymerization zone in the presence of a finely divided alkali metal catalyst and an inert solvent for the polymer and wherein there is withdrawn from said polymerization zone a mixture of said solvent containing polymer dissolved therein and alkali metal and wherein 1 to 25 wt. percent of acid clay, based on said polymer, is added to said mixture and the resulting mixture is filtered to remove the alkali metal, the improvement which comprises adding 0.1% to 10% of nphtha-insoluble gel formed by the polymerization of conjugated diolefins of 4 to 6 carbon atoms to said mixture withdrawn from said polymerization zone.

2. In a process for producing polymers of conjugated diolefins of 4 to 6 carbon atoms wherein the diolefins are polymerized in a polymerization zone in the presence of a finely divided alkali metal catalyst and an inert solvent for the polymer and wherein gels insoluble in said solvent are produced as a by-product of said polymerization, and wherein there is withdrawn from said polymerization zone a mixture of said solvent containing polymer dissolved therein, gel and alkali metal, and wherein 1 to 25 wt. percent of acid clay, based on said polymer, is added to said mixture and the resulting mixture is filtered to obtain a filtrate free of clay and gel and containing less than 100 p.p.m. of alkali metal and wherein periodically a filtrate is obtained which contains more than 100 p.p.m. of alkali metal, the improvement which comprises blending one part by weight of the filtrate containing more than 100 p.p.m. of alkali metal with at least one part by weight of said mixture of clay, gel and polymer solution and filtering the resulting mixture of filtered clay, gel and polymer solution.

3. The process of claim 1 in which the diolefin is butadiene and the alkali metal is sodium.

4. The process of claim 2 in which the diolefin is butadiene and the alkali metal is sodium.

References Cited by the Examiner
UNITED STATES PATENTS 2,522,378   9/50   Kirkbride _____ 210—196
2,862,982   12/58  Cull et al. _____ 260—94.7

LEON J. BERCOVITZ, *Primary Examiner.*